(12) United States Patent
Powers et al.

(10) Patent No.: US 10,146,234 B2
(45) Date of Patent: Dec. 4, 2018

(54) THERMOSTATIC VALVE HAVING ANTI-SIPHON FEATURE

(71) Applicant: Continental Automotive Systems, Inc., Auburn Hills, MI (US)

(72) Inventors: Michael Powers, Shelby Township, MI (US); Erin Beemer, Goodrich, MI (US); John Wattai, Rochester Hills, MI (US)

(73) Assignee: Continental Automotive Systems, Inc., Auburn Hills, MI (US)

( * ) Notice: Subject to any disclaimer, the term of this patent is extended or adjusted under 35 U.S.C. 154(b) by 2 days.

(21) Appl. No.: 15/219,645

(22) Filed: Jul. 26, 2016

(65) Prior Publication Data

US 2017/0060146 A1 Mar. 2, 2017

Related U.S. Application Data

(60) Provisional application No. 62/213,463, filed on Sep. 2, 2015.

(51) Int. Cl.
| | |
|---|---|
| *F16K 15/14* | (2006.01) |
| *G05D 16/06* | (2006.01) |
| *F02M 37/00* | (2006.01) |
| *F02M 37/10* | (2006.01) |
| *F16K 31/00* | (2006.01) |

(52) U.S. Cl.
CPC ..... *G05D 16/0636* (2013.01); *F02M 37/0023* (2013.01); *F02M 37/0035* (2013.01); *F02M 37/106* (2013.01); *F16K 15/148* (2013.01); *F16K 31/002* (2013.01); *Y10T 137/789* (2015.04)

(58) Field of Classification Search
CPC .. G05D 23/132; G05D 23/022; F16K 15/148; F02M 37/0035; F02M 37/0023; F02M 37/106
USPC ................................ 137/511, 843, 852, 854
See application file for complete search history.

(56) References Cited

U.S. PATENT DOCUMENTS

| | | | | |
|---|---|---|---|---|
| 2,326,651 A | * | 8/1943 | Husted | F16K 15/148 137/512.15 |
| 2,571,893 A | * | 10/1951 | Kendall | H01M 2/1205 137/469 |
| 2,579,855 A | * | 12/1951 | Pockel | F16K 15/148 137/854 |

(Continued)

FOREIGN PATENT DOCUMENTS

| | | |
|---|---|---|
| DE | 102006056161 A1 | 4/2008 |
| WO | 88/09867 A1 | 12/1988 |

(Continued)

*Primary Examiner* — Umashankar Venkatesan

(57) ABSTRACT

A thermostatic valve, which includes a main body portion, a cavity formed as part of a main body portion, and an inner wall integrally formed with the main body portion adjacent the cavity. A circumferential flange is integrally formed with the inner wall, such that the circumferential flange surrounds a valve cavity. A valve member is attached to the inner wall disposed in the valve cavity, and a flow aperture is formed as part of the inner wall. Fluid flows through the flow aperture into the valve cavity, and when the pressure in the valve cavity is above a predetermined value, the valve member contacts the inner wall, preventing fluid from flowing through the flow aperture.

12 Claims, 4 Drawing Sheets

(56) References Cited

U.S. PATENT DOCUMENTS

| | | | | |
|---|---|---|---|---|
| 2,777,464 A * | 1/1957 | Mosely | D06F 39/088 | 137/516.13 |
| 2,936,779 A * | 5/1960 | Kindred | A61M 16/208 | 137/854 |
| 3,059,637 A * | 10/1962 | Senne | B63C 11/12 | 128/206.22 |
| 3,179,122 A * | 4/1965 | Wasdell | F16F 9/348 | 137/454.5 |
| 3,633,613 A * | 1/1972 | Julow | B60T 13/241 | 137/512 |
| 3,905,386 A * | 9/1975 | Rachocki | E03C 1/104 | 137/215 |
| 3,941,149 A * | 3/1976 | Mittleman | A61M 39/24 | 137/493.1 |
| 4,513,784 A * | 4/1985 | Farrand | F16K 15/148 | 137/516.11 |
| 5,067,449 A * | 11/1991 | Bonde | F01M 13/00 | 123/41.86 |
| 5,415,146 A * | 5/1995 | Tuckey | B01D 35/0273 | 123/509 |
| 6,152,114 A | 11/2000 | Kleppner | | |
| 6,516,829 B1 * | 2/2003 | Townsend | B60T 17/004 | 137/512.15 |
| 6,889,707 B2 * | 5/2005 | Nicolino | F16K 15/148 | 137/513.3 |
| 8,206,126 B2 * | 6/2012 | Wattai | F02M 37/025 | 417/76 |
| 2013/0221118 A1 * | 8/2013 | Villaire | F16K 31/002 | 236/93 R |
| 2016/0146359 A1 * | 5/2016 | Ferguson | C09D 123/16 | 137/511 |

FOREIGN PATENT DOCUMENTS

| | | |
|---|---|---|
| WO | 2008/027061 A1 | 3/2008 |
| WO | 2015/071790 A1 | 5/2015 |

\* cited by examiner

THERMOSTATIC VALVE HAVING ANTI-SIPHON FEATURE

CROSS-REFERENCE TO RELATED APPLICATIONS

This application claims the benefit of U.S. Provisional Application No. 62/213,463 filed Sep. 2, 2015. The disclosure of the above application is incorporated herein by reference.

FIELD OF THE INVENTION

The invention relates generally to a valve for a fuel module used for preventing backflow when an undesirable pressure drop occurs.

BACKGROUND OF THE INVENTION

Fuel modules are commonly known, and are used for transferring fuel from a fuel tank to an engine. Several of these types of fuel modules have a return system, where fuel that is not consumed by the engine is returned to the fuel tank. These return systems typically operate at a certain pressure, typically less than 50 kPa. However, if any of the conduits or other components in the return system become compromised, such as disconnected or broken, the pressure in the return system may drop to undesirable levels, and cause the fuel module to malfunction.

Accordingly, there exists a need for a fuel module which has the capability to prevent an undesirable drop in pressure (in the fuel module) when one or more of the components in the fuel return system become compromised.

SUMMARY OF THE INVENTION

The present invention is a thermostatic valve assembly for use with a fuel module which functions to automatically close if the pressure applied to the valve falls below a predetermined value.

Diesel fuel passes through a valve, such as an umbrella valve, of the thermostatic valve assembly from the return system at approximately 50 kPa. When fuel pressure drops below approximately 15 kPa, the umbrella valve closes, preventing the diesel fuel from returning back through the fuel system. This functions to eliminate/reduce fuel from escaping the system in the event the return fuel lines are compromised outside of the fuel tank. It is therefore an object of this invention to prevent diesel fuel from siphoning out of the fuel tank when fuel lines have been compromised outside of the fuel tank.

It is another object of this invention to provide an anti-siphon valve integrated into thermostatic valve assembly which minimizes the packaging envelope required to meet customer requirements. It is yet another object of this invention to provide a thermostatic valve assembly with the anti-siphon feature which is able to be retrofitted into current applications.

In one embodiment, the present invention is an anti-siphon valve which is part of a thermostatic valve assembly, which includes a main body portion, a cavity formed as part of a main body portion, and an inner wall integrally formed with the main body portion adjacent the cavity. A circumferential flange is integrally formed with the inner wall, such that the circumferential flange surrounds a valve cavity. A valve member is attached to the inner wall disposed in the valve cavity, and a flow aperture is formed as part of the inner wall. Fluid flows through the flow aperture into the valve cavity, and when the pressure in the valve cavity is above a predetermined value in comparison to the pressure in the cavity, the valve member contacts the inner wall, preventing fluid from flowing through the flow aperture.

The valve member includes a flexible flange portion which deflects and contacts the inner wall when the pressure in the valve cavity reaches above a predetermined value. There is also a mounting aperture formed as part of the inner wall, and a base portion integrally formed with the flexible flange portion, and a retention feature integrally formed as part of the base portion, where the base portion and the retention feature are part of the valve member. The base portion extends through the mounting aperture, and the retention feature prevents the base portion from being removed from mounting aperture.

In one embodiment, the flexible flange portion is formed such that the flexible flange portion has a default position, and when the flexible flange portion is in the default position, the flexible flange portion is biased towards and contacts the inner wall, and prevents fluid from flowing through the flow aperture.

In one embodiment, the anti-siphon valve is connected to an inner assembly, which is part of a fuel module. The inner assembly includes a manifold housing, and the anti-siphon valve is connected to the manifold housing. At least one support member is formed as part of the manifold housing, and at least one contact surface is formed as part of the at least one support member. The valve member is in contact with the contact surface when the pressure in the cavity is greater than the pressure in the valve cavity by a predetermined amount. The manifold housing includes a wall portion which forms a manifold cavity, and at least one inner flow aperture is adjacent the support member. The inner flow aperture provides fluid communication between the manifold cavity and the valve cavity.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Figure 1:
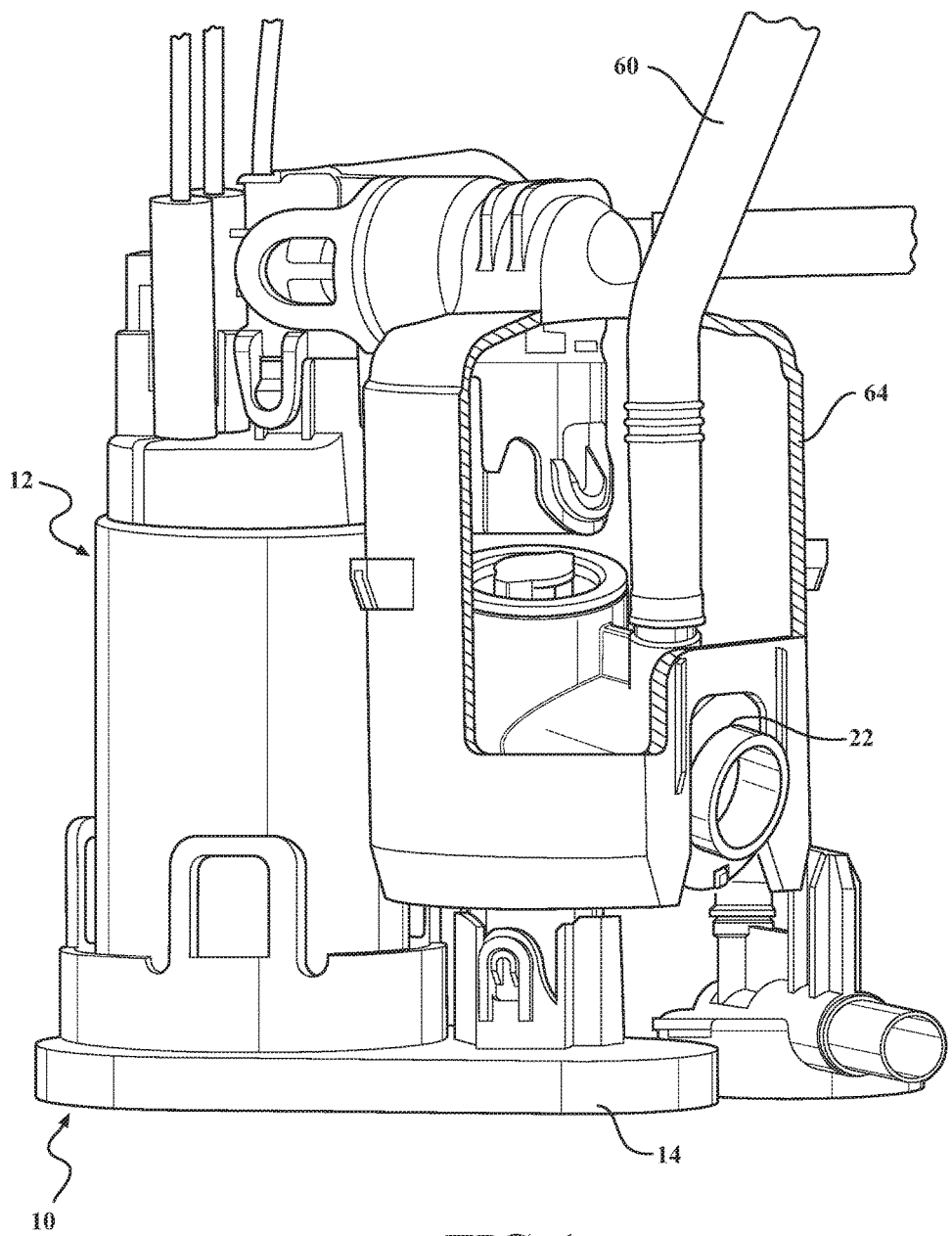
FIG. 1 is a perspective view of a fuel module having a thermostatic valve, with a portion of a manifold housing cut-away, according to embodiments of the present invention.
Figure 2:
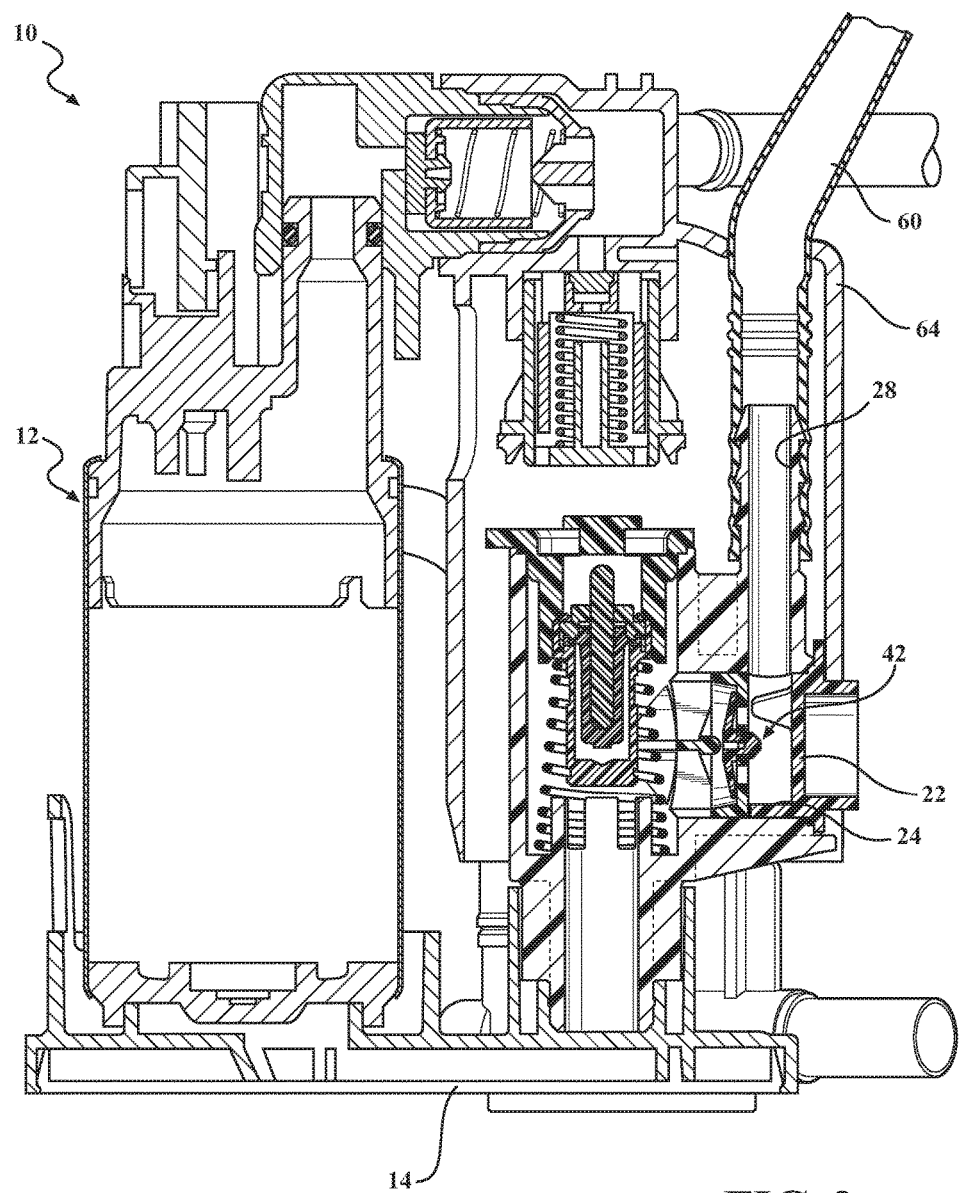
FIG. 2 is a sectional side view of a fuel module having a thermostatic valve, according to embodiments of the present invention.

A first embodiment of a fuel module having a thermostatic valve assembly according to the present invention is shown in FIGS. 1-2, generally at 10. The module 10 includes a pump assembly, shown generally at 12, having an electric motor, and a pumping mechanism, shown generally at 16. The pumping mechanism 16 may be any type of pumping mechanism capable of transferring fluid, which in this embodiment is an impeller pump. Connected to the pump assembly 12 is a fuel filter 14, and also connected to the fuel filter 14 is a housing 18, which is part of an inner assembly, shown generally at 20.

Referring to FIGS. 3A-3E, the assembly 20 also includes an anti-siphon valve 22 located in a cavity, shown generally at 24, formed as part of the housing 18. The valve 22 includes a cavity, shown generally at 25, formed as part of a main body portion 26, where the cavity 25 is in fluid communication with an inlet port 28 formed as part of the housing 18 such that fuel located in the cavity 25 and the inlet port 28 are at substantially the same pressure. The valve 22 includes a stepped portion 30 which is connected to the housing 18 using a weld connection. However, it is within the scope of the invention that any suitable connection method may be used.

The main body portion 26 also has an inner wall 32, which includes a mounting aperture 34 and several flow apertures 36. Integrally formed with the inner wall 32 is a circumferential flange 38, and surrounded by the circumferential flange 38 is a valve cavity, shown generally at 40. Disposed within the valve cavity 40 is a valve member 42, which in this embodiment is an umbrella valve, but it is within the scope of the invention that other types of valves may be used. The valve member 42 includes a mounting base portion 44, and integrally formed with the base portion 44 is a retention feature 46. The base portion 44 is disposed in the mounting aperture 34, and the retention feature 46 maintains the connection between the valve member 42 and the inner wall 32, by preventing the base portion 44 from being removed (i.e., moved through) from the mounting aperture 34.

The valve member 42 also includes a flexible flange portion 48 which selectively contacts either the inner wall 32, or a plurality of contact surfaces 50, where each contact surface 50 is part of corresponding support member 52, and each support member 52 supports the flexible flange portion 48 when the flange portion 48 is in contact with the contact surfaces 50. The valve member 42 is located such that a portion of the inner wall 32 is located between the retention feature 46 and the flexible flange portion 48. Each support member 52 is integrally formed with the housing 18, and there are several inner flow apertures 54 located in between the support members 52. The inner flow apertures 54 place the valve cavity 40 in fluid communication with a manifold cavity, shown generally at 56, formed as part of the housing 18 such that fuel located in the manifold cavity 56 and the valve cavity 40 is at substantially the same pressure. There is a wax motor assembly, shown generally at 58, disposed in the manifold cavity 56, and the manifold cavity 56 is surrounded by a wall portion 62 of the housing 18.

Figure 3A:
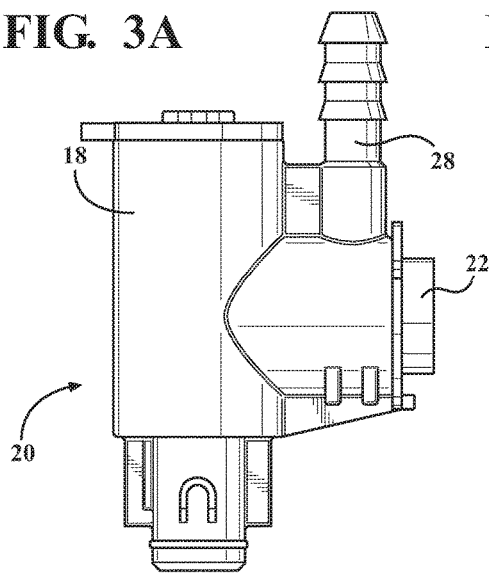
FIG. 3A is a side view of an inner assembly of a fuel module having a thermostatic valve, according to embodiments of the present invention.
Figure 3B:
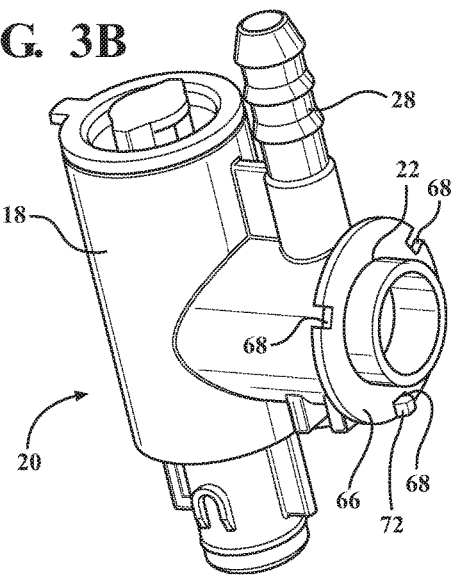
FIG. 3B is a first perspective view of an inner assembly of a fuel module having a thermostatic valve, according to embodiments of the present invention.
Figure 3C:
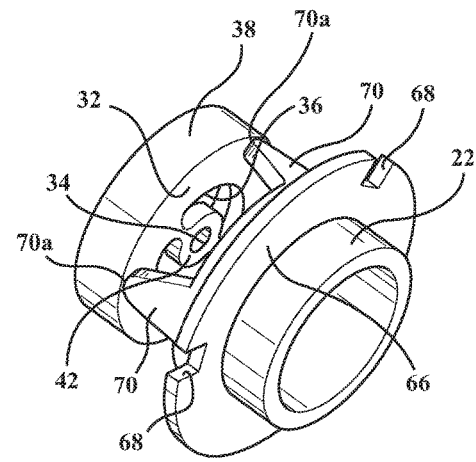
FIG. 3C is a perspective view of a thermostatic valve, according to embodiments of the present invention.
Figure 3D:
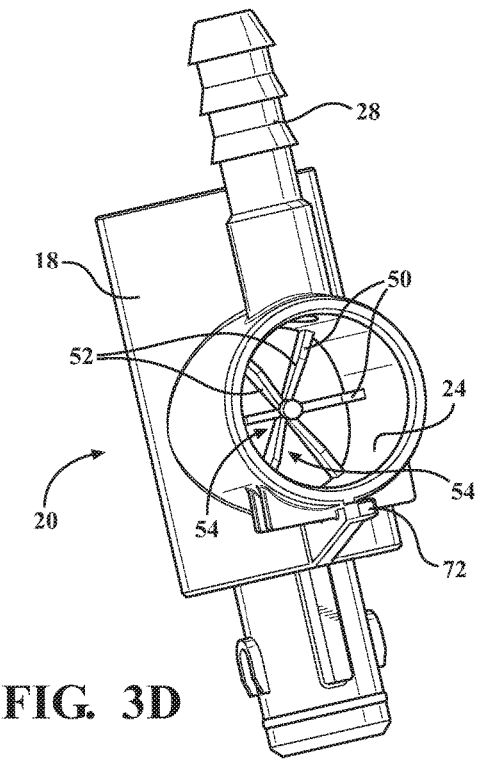
FIG. 3D is a second perspective view of an inner assembly of a fuel module, with the thermostatic valve removed, according to embodiments of the present invention.

The anti-siphon valve 22 also includes several alignment features, to ensure that the valve 22 is connected to the housing 18 properly. The valve 22 includes an outer flange 66, and formed as part of the outer flange 66 is a plurality of notches 68. Also formed as part of the outer flange 66 is a plurality of arcuate support members 70, each of which has an apex 70a, that is connected to the inner wall 32 during assembly through a process such as welding, or the like. There are three arcuate support members 70, which are equally spaced apart. There is an extension or keyway 72 that is formed as part of the housing 18, and during assembly, the valve 22 is positioned such that the keyway 72 is engaged with one of the notches 68. The notches 68 are positioned relative to the arcuate support members 70 such that when the valve 22 is connected to the housing 18 as shown in FIG. 3C, the flow of fuel is least impeded by one of the arcuate support members 70. The valve 22 may be connected to the housing 18 such that the keyway 72 may be engaged with any one of the notches 68, as shown in FIGS. 3B and 3E.

Figure 3E:
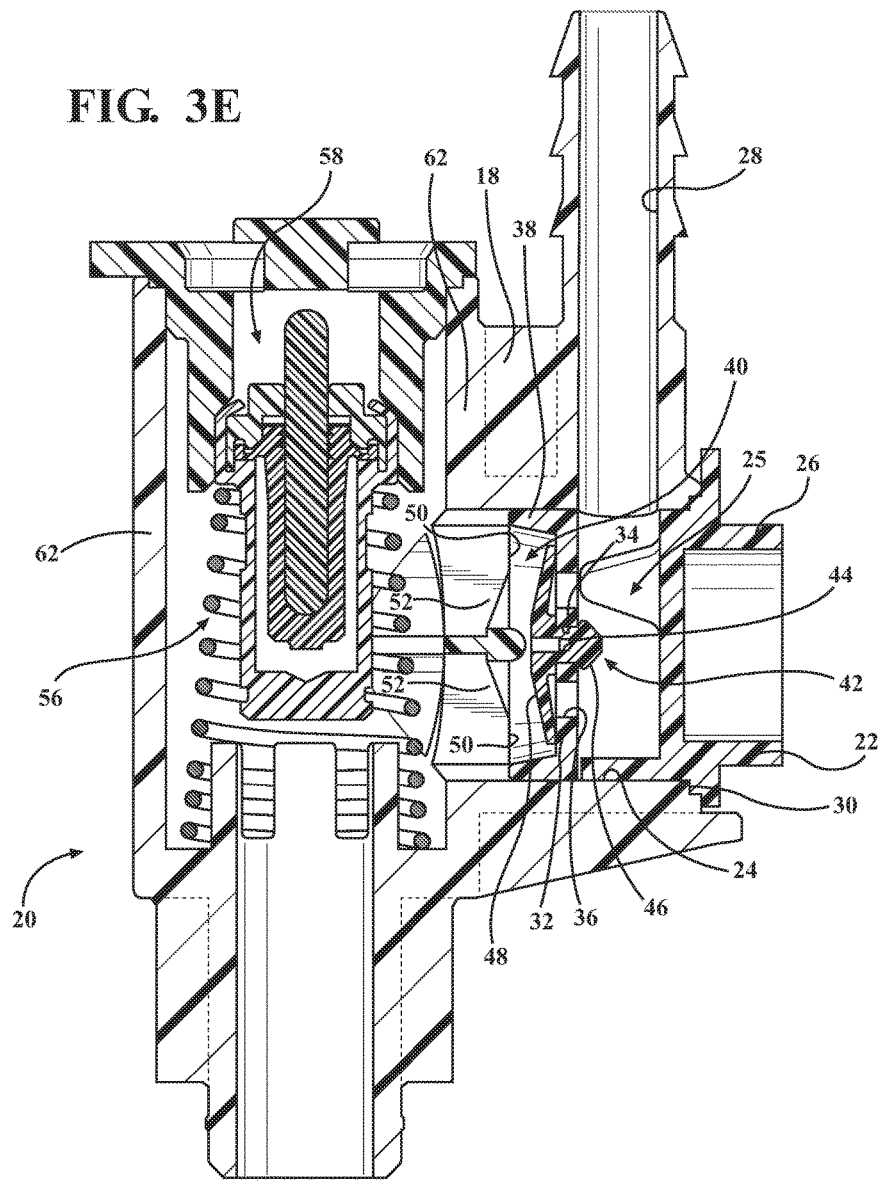
FIG. 3E is a sectional side view of an inner assembly of a fuel module having a thermostatic valve, according to embodiments of the present invention.

The flexible flange portion 48 is constructed to have a default position, shown in FIG. 3E, where the flange portion 48 is in contact with the inner wall 32. In this embodiment, the flange portion 48 is constructed such that the flange portion 48 has a default position shown in FIGS. 2 and 3E, where the flange portion 48 is biased towards and contacts the inner wall 32.

During operation, fuel is able to flow from the inlet port 28, through the cavity 25, through the flow apertures 36, and contact the flange portion 48, but the fuel does not flow around the flange portion 48 because of the flange portion 48 being biased to contact the inner wall 32. In order for the flange portion 48 to move away from the inner wall 32 and allow the fuel to pass around the flange portion 48, the flow of fuel from the inlet port 28 must be such that enough pressure is applied to the flexible flange portion 48 to cause the flexible flange portion 48 to deflect and move away from the inner wall 32, allowing fuel to pass through the flow aperture 36 and flow around the flange portion 48. However, if there is pressure in the manifold cavity 56, and therefore the valve cavity 40, which combined with the biasing force of the flange portion 48, exceeds the pressure in the inlet port 28, and therefore the cavity 25, the flexible flange portion 48 deflects to contact the inner wall 32, preventing additional fuel from passing through the flow aperture 36. Once the pressure in the manifold cavity 56 has dissipated, the pressure from the fuel in the valve cavity 40 applied to the flange portion 48 is reduced enough, and there is sufficient pressure applied to the flange portion 48 from the fuel flowing from the inlet port 28, the flange portion 48 moves away from and is again no longer in contact with the inner wall 32, allowing fuel to again pass through the inner apertures 54.

The flange portion 48 may deflect different amounts, depending on the difference in pressure in the manifold cavity 56 compared to the pressure in the inlet port 28, such that fuel is still allowed to pass through the flow aperture 36. Furthermore, when the pressure imbalance exists between the cavity 25 and the valve cavity 40 such that the flange portion 48 is not in contact with the inner wall 32 as described above, it is also possible for the flexible flange portion 48 to deflect slightly, but still not contact either of the inner wall 32 or any of the surfaces 50, which allows for small pressure fluctuations in the fuel flowing from the inlet port 28 to the cavity 25 or the fuel located in the valve cavity 40 (and therefore the manifold cavity 56).

The inner assembly 20 is substantially surrounded by a manifold housing 64. Extending into the manifold housing 64 is a return conduit 60, which is connected to the inlet port 28. The return conduit 60 is part of a fuel return system, which transfers unused fuel back to the fuel module 10. If one of the components in the return system malfunctions or becomes otherwise compromised, the pressure in the return conduit 60, and therefore the inlet port 28 and cavity 25, is reduced and becomes too low, this again creates a pressure imbalance between the cavity 25 formed as part of the main body portion 26 and the valve cavity 40. The relative pressure difference between the cavity 25 and the valve cavity 40, along with the biasing force of the flexible flange portion 48, causes the flexible flange portion 48 to contact the inner wall 32 preventing the fluid pressure in the manifold cavity 56 from dropping to an undesirable level.

During operation, if the pressure in the cavity 25 is much greater than the pressure in the valve cavity 40, the flexible flange portion 48 may deflect enough to contact the contact surfaces 50. Another advantage of the present invention is that the support members 52 and contact surfaces 50 are positioned to limit the amount that the flexible flange portion 48 may deflect, therefore providing a maximum about the flange portion 48 may deflect, regardless of the pressure difference between the cavity 25 and the valve cavity 40. Limiting the amount the flange portion 48 may deflect prevents the flange portion 48 from permanently deforming, and ensures that the flange portion 48 is able to return to the default position once the pressure of the fuel in the cavity 25 is sufficiently less than the pressure in the valve cavity 40.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. An apparatus, comprising:
    an anti-siphon valve, including:
    a main body portion;
    a cavity formed as part of the main body portion;
    an inner wall integrally formed with the main body portion adjacent the cavity;
    a valve member attached to the inner wall, such that the inner wall is disposed in the cavity;
    a circumferential flange integrally formed with the inner wall;
    an inner assembly, comprising:
        a manifold housing being part of the inner assembly, the anti-siphon valve connected to the manifold housing;
        at least one support member formed as part of the manifold housing, a portion of the at least one support member in contact with the circumferential flange;
    wherein a portion of the valve member is in a closed position contacting the inner wall to prevent fluid from flowing from the cavity when the pressure in the cavity is below a predetermined value and the portion of the valve member is movable to an open position disposed away from the inner wall when the pressure in the cavity is above the predetermined value, and
    wherein the portion of the valve member is constructed and arranged so as to engage the at least one support member, while the valve member remains attached to the inner wall, to limit movement of the portion of the valve member when the pressure in the cavity is significantly greater than the predetermined value.

2. The apparatus of claim 1, further comprising:
    at least one flow aperture integrally formed as part of the inner wall;
    wherein fluid flows from the cavity and through the at least one flow aperture when the valve member is moved away from the inner wall, and when the pressure in the cavity is below a predetermined value, the valve member is biased to contact the inner wall, preventing fluid from flowing through the at least one flow aperture.

3. The apparatus of claim 2, further comprising
    a flexible flange portion;
    wherein the flexible flange portion deflects and contacts the inner wall when the pressure in the cavity is below a predetermined value.

4. The apparatus of claim 3, further comprising:
    a mounting aperture formed as part of the inner wall;
    a base portion integrally formed with the flexible flange portion, the base portion being part of the valve member; and
    a retention feature integrally formed as part of the base portion, the retention feature being part of the valve member;
    wherein the base portion extends through the mounting aperture, and the retention feature prevents the base portion from being removed from mounting aperture.

5. The apparatus of claim 3, wherein the flexible flange portion further comprises a default position, and when in the default position, the flexible flange portion is biased towards and contacts the inner wall, preventing fluid from flowing through the at least one flow aperture.

6. The apparatus of claim 1, further comprising:
    a valve cavity surrounded by the circumferential flange, the valve cavity located on the opposite side of the inner wall in relation to the cavity, the valve member being disposed in the valve cavity;
    wherein the valve member is biased to contact the inner wall, preventing fluid from flowing through the at least one flow aperture, when the pressure in the valve cavity is above a predetermined value in comparison to the pressure in the cavity.

7. The apparatus of claim 6, the inner assembly further comprising:
    at least one contact surface formed as part of the at least one support member, the at least one contact surface in contact with the valve member when the pressure in the cavity is greater than the pressure in the valve cavity by a predetermined amount
    a manifold cavity formed as part of the manifold housing;
    a wall portion formed as part of the manifold housing, the wall portion surrounding the manifold cavity; and
    at least one inner flow aperture adjacent the at least one support member;
    wherein the at least one inner aperture provides fluid communication between the manifold cavity and the valve cavity.

8. An anti-siphon valve, including: a main body portion; a cavity formed as part of a main body portion; an inner wall integrally formed with the main body portion adjacent the cavity; a circumferential flange integrally formed with the inner wall; a valve cavity surrounded by the circumferential flange, the valve cavity located on the opposite side of the inner wall in relation to the cavity; a valve member attached to the inner wall and disposed in the valve cavity; and at least one flow aperture formed as part of the inner wall; an inner assembly, comprising: a manifold housing being part of the inner assembly, the anti-siphon valve connected to the manifold housing; at least one support member formed as part of the manifold housing, a portion of the at least one support member in contact with the circumferential flange; at least one contact surface formed as part of the at least one support member, the at least one contact surface in contact with the valve member when the pressure in the cavity is greater than the pressure in the valve cavity by a predetermined amount and while the valve member remains attached to the inner wall; wherein in operation, fluid flows from the cavity, through the at least one flow aperture, and into the valve cavity, and when the pressure in the valve cavity is above a predetermined value in comparison to the pressure in the cavity, a portion of the valve member contacts the inner wall, preventing fluid from flowing through the at least one flow aperture.

9. The anti-siphon valve of claim 8, further comprising:
a flexible flange portion, the flexible flange portion being part of the valve member;
wherein the flexible flange portion deflects and contacts the inner wall when the pressure in the valve cavity is above a predetermined value in comparison to the pressure in the cavity.

10. The anti-siphon valve of claim 9, further comprising:
a mounting aperture formed as part of the inner wall;
a base portion integrally formed with the flexible flange portion, the base portion being part of the valve member; and
a retention feature integrally formed as part of the base portion, the retention feature being part of the valve member;
wherein the base portion extends through the mounting aperture, and the retention feature prevents the base portion from being removed from mounting aperture.

11. The anti-siphon valve of claim 9, wherein the flexible flange portion is formed such that the flexible flange portion further comprises a default position, and when the flexible flange portion is in the default position, fluid is prevented from flowing through the at least one flow aperture.

12. The anti-siphon valve of claim 8, further comprising:
a manifold cavity formed as part of the manifold housing;
a wall portion formed as part of the manifold housing, the wall portion surrounding the manifold cavity; and
at least one inner flow aperture adjacent the at least one support member;
wherein the at least one inner flow aperture provides fluid communication between the manifold cavity and the valve cavity.

* * * * *